United States Patent [19]

Taylor

[11] 4,315,632
[45] Feb. 16, 1982

[54] FOLDING TWO-WHEELED HAND TRUCK

[76] Inventor: Frank E. Taylor, 1440 S. Seneca, Wichita, Kans. 67213

[21] Appl. No.: 153,451

[22] Filed: May 27, 1980

[51] Int. Cl.³ .............................................. B62B 1/04
[52] U.S. Cl. .................................. 280/40; 280/47.29
[58] Field of Search .............. 280/47.27, 47.28, 47.29, 280/652, 654, 38, 39, 40, 47.26

[56] References Cited

U.S. PATENT DOCUMENTS

| | | | |
|---|---|---|---|
| 863,972 | 8/1907 | Ehlers | 280/39 |
| 3,043,603 | 7/1962 | Major | 280/47.29 X |
| 3,166,339 | 1/1965 | Earley | 280/47.26 X |
| 3,241,852 | 3/1966 | Muller et al. | 280/47.29 X |
| 3,659,867 | 5/1972 | Curry | 280/47.27 X |

FOREIGN PATENT DOCUMENTS 2117 of 1911 United Kingdom ................ 280/39

Primary Examiner—John A. Pekar
Attorney, Agent, or Firm—John H. Widdowson

[57] ABSTRACT

A hand truck has a frame; a pair of rotating bars rotatably attaching to the frame. Each bar includes a wheel rotatably attached thereon, a handle attached to one end of the bar and a first gear connected to the other end. Handle release and locking members are attached to the frame and lock the wheels and the handle either in an outward operative position or in a closed storing position. A support bar is rotatably connected to the frame. A second gear is attached to each end of the support bar and meshes with the first gear on each side of the pair of rotating bars. A load support plate is bound to the support bar in order to support a load when the wheels and handle are in the outward operative position.

7 Claims, 10 Drawing Figures

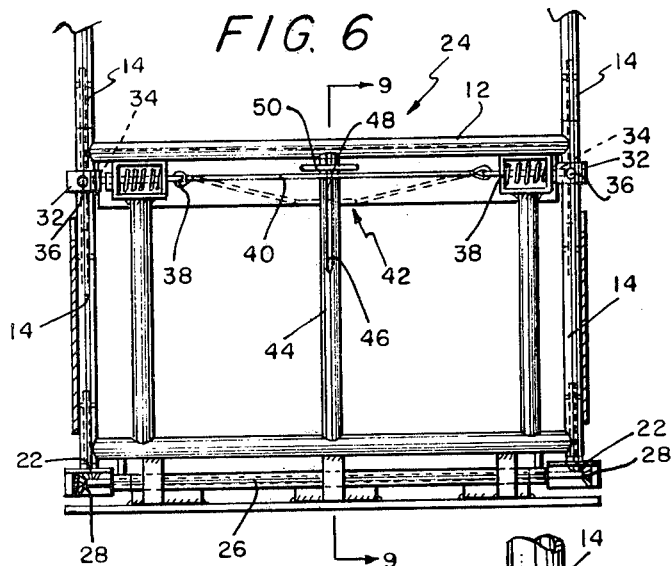
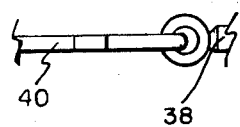
FIG. 6
FIG. 10
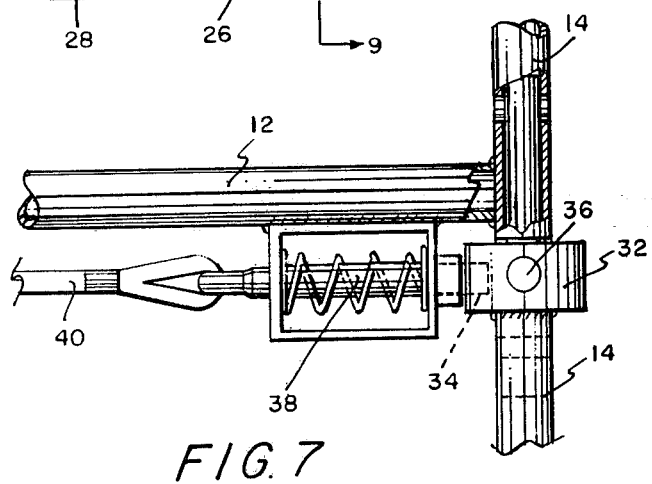
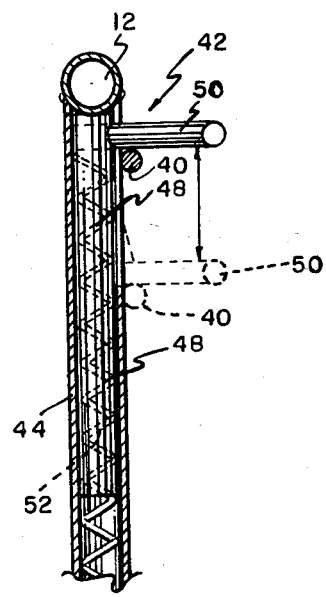
FIG. 7
FIG. 9
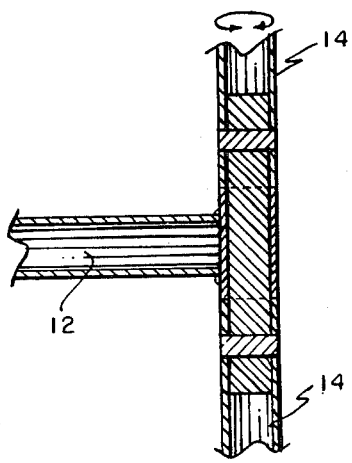
FIG. 8

FOLDING TWO-WHEELED HAND TRUCK

BACKGROUND OF THE INVENTION

1. Field of the Invention

This invention is related to a two-wheeled hand truck. More specifically, this invention provides a hand truck which can be easily folded for storing and transportation.

2. Description of Prior Art

U.S. Pat. No. 3,043,603 by Major, Sr. discloses a two-wheeled hand truck with pivoted wheel supports. U.S. Pat. No. 3,166,339 by Earley discloses a folding lawn cart. U.S. Pat. No. 3,241,852 by Muller et al illustrates a folding cart for outboard motors. U.S. Pat. No. 3,659,867 by Curry teaches a foldable two-wheel dolly. None of the foregoing prior art teaches or suggests this invention.

SUMMARY OF THE INVENTION

This invention accomplishes its desired objects by providing a two-wheeled hand truck comprising a frame having a longitudinal axis and being generally upright in an operative or stored position. A pair of rotating bars rotatably attach to the frame and rotate about the longitudinal axis. Each bar has a wheel rotatably attached thereon, a handle means attached to one end of the bar, and a first gear means connected to the other end of the bar. A handle release and locking means attached to the frame and locks the wheels and the handle means either in an outward operative position or in a closed storing position. A support bar rotatably connects to the frame. A second gear means attached to each end of the support bar and meshes with the first gear means on each end of the pair of rotating bars. A load support means is bound to the support bar in order to support a load when the wheels and handle are in the outward operative position.

It is an object of the invention to provide a two-wheeled hand truck.

Still further objects of the invention reside in the provision of a two-wheeled hand truck which can be easily stored, provides an easy accessibility lever for folding out the hand trucks into an operative position, and is relatively inexpensive to manufacture.

These together with the various ancillary objects and features which will become apparent as the following description proceeds are attained by this hand truck, a preferred embodiment being shown in the accompanying drawings, by way of example only, wherein:

BRIEF DESCRIPTION OF THE DRAWINGS

FIG. 6 is a vertical sectional view taken along the plane of line 5—5 in FIG. 4;

FIG. 7 is a partial enlarged partially sectional view of a locking pin and a cylindrical retention member;

FIG. 8 is a vertical sectional view taken along the plane of line 7—7 in FIG. 5;

FIG. 9 is a partial vertical sectional view of the frame connecting to a rotating bar; and FIG. 10 is a partial view of the coil connecting to a locking pin.

DETAILED DESCRIPTION OF THE INVENTION

Figure 1:
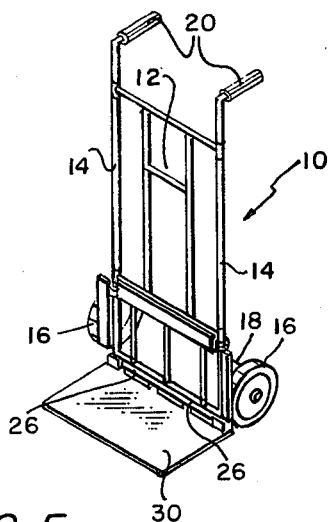
FIG. 1 is a perspective view of the invention.
Figure 2:
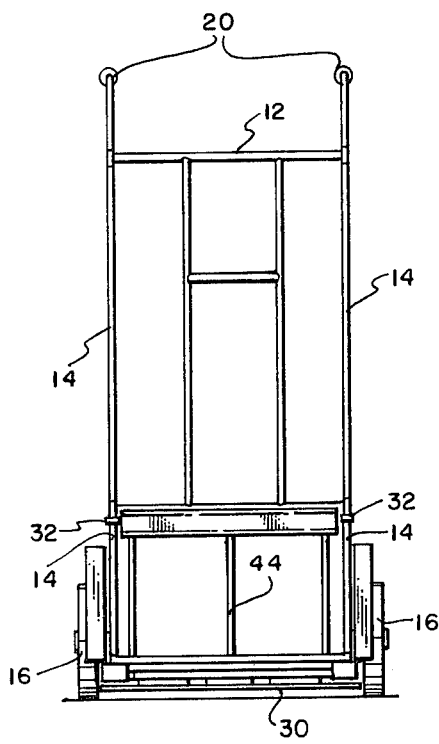
FIG. 2 is a front elevational view of the invention.
Figure 5:
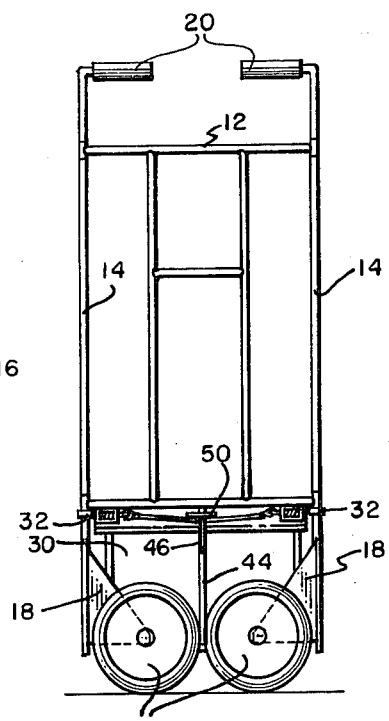
FIG. 5 is a rear elevational view of the invention.
Figure 4:
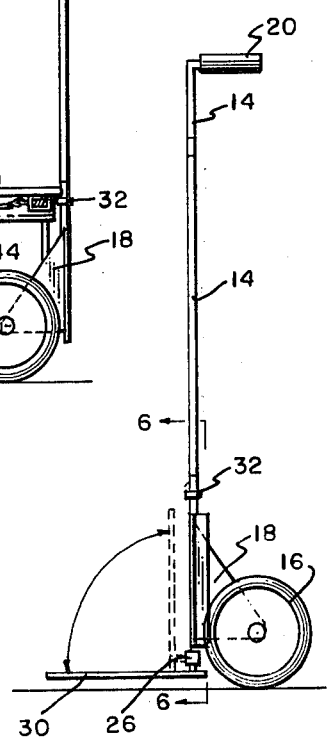
FIG. 4 is a side elevational view of the invention with dotted lines indicating the upright stored position of the support plate.
Figure 3:
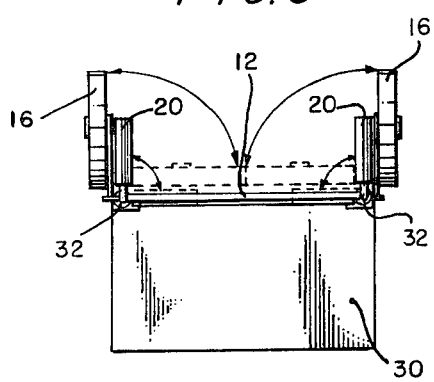
FIG. 3 is a top plan view of the invention with dotted lines indicating the stored position of the wheels and handle.

Referring in detail now to the drawings, wherein like reference numerals designate similar parts throughout the various views, there is seen a two-wheeled hand truck, generally illustrated as 10, comprising a frame 12 with a longitudinal axis and generally upright when the hand truck 10 is in an upright or stored position. A pair of rotating bars 14 rotatably attach to the frame 12 and rotate about the longitudinal axis. Wheels 16 rotatably attach to wheel engaging members 18 which are bound to the rotating bars 14. A handle 20 attaches to an end of each bar 14, and a first gear 22 (see FIG. 6) connects to the other end of each bar 14. A handle release and locking means, generally illustrated as 24 (see FIG. 6), attaches to the frame 12 and locks the wheels 16 and the handle 20 either in an outward operative position (see FIG. 1) or in a closed storing position. A support bar 26 rotatably connects to the frame 12 and a second gear 28 (see FIG. 6) attaches to each end of the support bar 26 and meshes with the first gear 22 on each end of the pair of rotating bars 14. A load support plate 30 is bound to the support bar 26 in order to support a load when the wheels 16 and handle 20 are in the outward operative position of FIG. 1. In operation of the invention, the wheels 16 fold out from the frame 12 (see direction of arrows in FIG. 3) toward the eventual operative perpendicular position with respect to the frame 12 as each handle 20 on each of the rotating bars 14 is released by the handle release and locking means 24 and rotated outwardly from the dotted line position of FIG. 3. This simultaneously causes the first gear 22 on each bar 14 to engage and turn the second gear 28 on each end of the support bar 26 resulting in the support 26 rotating to fold out the support plate 30 (see FIG. 4) to a generally perpendicular position with respect to the frame 12 wherein each of the handles 20 is positioned in the locked operative position of FIGS. 1–4.

The handle release and locking means 24 comprise two generally cylindrical members 32 (see FIGS. 6 and 7) bound to rotating bar 14 and include an opening recess 34 and a closing recess 36; and a pair of spring-biased locking pins 38 oppositely situated with respect to each other. The cylindrical retention members 32 are attached to the rotating bars 14 between the wheel-engaging member 18 and the handle 20. In operation of the invention, one of the pins 38 inserts into the opening recess 34 of one cylindrical member 32 and simultaneously the other pin 38 inserts into the opening recess 34 of the other cylindrical member 32 when each of the handles 20 is locked in the open position. Vice versa, in the continuing operation of the invention, one of the pins 38 inserts into the closing recess 36 of one cylindrical member 32 and the other pin 38 simultaneously inserts into the closing recess 36 of the other cylindrical member 32 when each handle 20 is locked in the dotted line inward closed position of FIG. 3. A spring-biased pin contracting means 40 (preferably a coil) attached to spring-biased pins 38 to contract the same in order to release the handles 20, the wheels 16 and the support plate 30 from either the open position or the closed position. The handle release and locking means 24 also comprises spring-biased toe activating means generally illustrated as 42 (see FIGS. 6 and 9), for engaging the coil 40.

Toe activating means 42 includes an essentially tubular member 44 with a slot 46 attached to the frame 12 between the spring-biased pins 38. A toe engaging member 48 slidably lodges within the tubular member 44 and has a generally T-shaped structural portion 50 protruding through slot 46 in order that, in operation of the invention, portion 50 is accessible for a downward motion (see FIG. 9) caused by a human foot for engaging the coil 40. Coiled spring 52 engages the toe engaging member 48 within the tubular member 44 for disengaging same from the coil 40 (see dotted line position in FIG. 9).

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. A hand truck comprising a frame having a longitudinal axis and generally upright in an operative or stored position;
   a pair of rotating bars rotatably attached to said frame and rotating about said longitudinal axis;
   each bar including a wheel rotatably attached thereon, a handle means attached to one end of said bars and a first gear means connected to the other end of same;
   a handle release and locking means attached to said frame and locking wheels and the handle means in either an outward operative position perpendicular to said frame or in a closed storing position;
   a support bar rotatably connected to said frame;
   a second gear means attached to each end of said support bar and meshing with the first gear means on each end of said pair of rotating bars;
   a load support means bound to said support bar in order to support a load when said wheels and handle means are in the operative position;
   said wheels folding out from said frame toward the eventually operative perpendicular position with respect to the frame as each handle means on each of the rotating bars is released by the handle release and locking means and rotated outwardly which simultaneously causes the first gear means on each rotating bar to engage and turn the second gear means on each end of said support bar resulting in the support bar rotating to fold out the support means to a generally perpendicular position with respect to the frame wherein each of the handle means is positioned in a locked operative position.

2. The hand truck of claim 1 wherein said handle release and locking means comprises two generally cylindrical retention members, one retention member being bound to one rotating bar and the other bound to the other rotating bar, said cylindrical retention members having a structure defined by an opening recess and a closing recess;
   a pair of spring-biased locking pins oppositely situated with respect to each other;
   one of said pins inserting into the opening recess of one cylindrical member and simultaneously the other pin inserting into the opening recess of the other cylindrical member when each of said handle means is locked in the open position;
   one of said pins inserting into the closing recess of one cylindrical member and the other pin simultaneously inserting into the closing recess of the other cylindrical member when each of said handle means is locked in the inward closed position;
   a spring-biased pin contracting means attached to said spring-biased pins to contract said spring-biased pins to release said handle means, said wheels and said support means from either the open position or the closed position; and
   spring-biased toe activating means for engaging said spring-biased pin contracting means.

3. The hand truck of claim 2 wherein said spring-biased toe activating means comprises an essentially tubular member attached to said frame between said spring biased pins, said tubular member having a structure defining a slotted aperture;
   a toe engaging member slidably lodging within said tubular member and including a generally T-shaped structural portion protruding through said slotted aperture in order to be accessible for a downward motion caused by a human foot for engaging said spring-biased pin contracting means; and
   a coiled spring engaging said toe engaging member within said tubular member for disengaging same from said contracting means.

4. The hand truck of claim 3 wherein said spring-biased pin contracting means is a coil.

5. The hand truck of claim 4 additionally including two wheel-engaging members for rotatably holding said wheels and bound to said rotating bar in proximity to said first gear means.

6. The hand truck of claim 5 wherein said cylindrical retention members are attached to said rotating bars between said wheel-engaging members and said handle means.

7. The hand truck of claim 6 wherein said supporting means is a support plate.

* * * * *